(12) United States Patent
Funck et al.

(10) Patent No.: US 11,649,850 B2
(45) Date of Patent: May 16, 2023

(54) ROD END MADE OF THERMOPLASTIC FIBER-REINFORCED PLASTIC

(71) Applicant: Albany Engineered Composites, Inc., Rochester, NH (US)

(72) Inventors: Ralph Funck, Kaiserslautern (DE); Volker Schimmelpfennig, Kaiserslautern (DE)

(73) Assignee: Albany Engineered Composites, Inc., Rochester, NH (US)

( * ) Notice: Subject to any disclaimer, the term of this patent is extended or adjusted under 35 U.S.C. 154(b) by 235 days.

(21) Appl. No.: 16/907,659

(22) Filed: Jun. 22, 2020

(65) Prior Publication Data
US 2020/0400190 A1 Dec. 24, 2020

(30) Foreign Application Priority Data
Jun. 23, 2019 (DE) ............ 10 2019 004 341.3

(51) Int. Cl.
*F16C 7/02* (2006.01)
*F16D 1/06* (2006.01)
*F16B 7/18* (2006.01)

(52) U.S. Cl.
CPC ........... *F16C 7/026* (2013.01); *F16D 1/06* (2013.01); *F16B 7/18* (2013.01); *F16C 2208/02* (2013.01);
(Continued)

(58) Field of Classification Search
CPC .. F16C 7/02; F16C 7/026; F16C 11/04; F16C 2208/02; F16C 2208/20; F16C 2208/58; F16B 7/18; F16D 1/06
See application file for complete search history.

(56) References Cited

U.S. PATENT DOCUMENTS 3,056,167 A * 10/1962 Knoppel ............... B29C 70/46
  425/111
3,279,278 A * 10/1966 Eldred ................. B29C 70/86
  416/134 A
(Continued)

FOREIGN PATENT DOCUMENTS

CN   104879646 A   9/2015
DE    1084088 B    6/1960
(Continued)

OTHER PUBLICATIONS

Machine translation of CN 104879646 A obtained on Jun. 9, 2022.*
(Continued)

*Primary Examiner* — Adam D Rogers
(74) *Attorney, Agent, or Firm* — McCarter & English, LLP (57) ABSTRACT

The present invention achieves a high mechanical load capacity of a rod end by means of a component loop that passes around a bearing, where the component may be made of continuous-fiber reinforced composite material with thermoplastic matrix and where the continuous-fiber reinforced composite material with thermoplastic matrix may extend into a threaded stem of the rod end, and the component made of continuous-fiber reinforced composite material with thermoplastic matrix may be enclosed by short-fiber reinforced, long-fiber reinforced, or unreinforced thermoplastic. The threaded stem can be implemented with an external or an internal thread.

23 Claims, 8 Drawing Sheets

(52) U.S. Cl.
CPC ...... *F16C 2208/20* (2013.01); *F16C 2208/58* (2013.01)

(56) References Cited

U.S. PATENT DOCUMENTS

| | | | | |
|---|---|---|---|---|
| 3,434,373 | A * | 3/1969 | Ditlinger | F16C 7/026 |
| | | | | 416/134 A |
| 4,050,827 | A | 9/1977 | Jonda | |
| 4,248,062 | A * | 2/1981 | McLain | B29C 70/86 |
| | | | | 156/149 |
| 4,353,267 | A * | 10/1982 | Robert | B29C 53/564 |
| | | | | 74/579 R |
| 4,811,626 | A * | 3/1989 | Bezin | B62M 3/00 |
| | | | | 74/594.1 |
| 4,857,124 | A | 8/1989 | Shobert et al. | |
| 5,129,148 | A | 7/1992 | Adams et al. | |
| 5,374,780 | A * | 12/1994 | Pazdirek | B29C 70/86 |
| | | | | 174/209 |
| 6,564,675 | B1 * | 5/2003 | Jiang | B62K 19/16 |
| | | | | 74/594.1 |
| 8,024,993 | B2 * | 9/2011 | Dal Pra | B62M 3/00 |
| | | | | 74/594.1 |
| 8,777,162 | B2 * | 7/2014 | Benthien | F16C 7/026 |
| | | | | 244/131 |
| 10,017,244 | B2 * | 7/2018 | Mandel | B29C 66/304 |
| 10,487,869 | B2 * | 11/2019 | Beale | B62D 29/048 |
| 10,794,419 | B2 * | 10/2020 | Coppola | B29C 64/106 |
| 11,453,180 | B2 * | 9/2022 | Gralka | B29C 70/70 |
| 2016/0114884 | A1 | 4/2016 | Safran | |

FOREIGN PATENT DOCUMENTS

| | | | | |
|---|---|---|---|---|
| DE | 1995788 U | | 8/1968 | |
| DE | 19615872 A1 | | 10/1997 | |
| DE | 10 2006 058377 A1 | | 6/2008 | |
| EP | 0930443 A2 * | | 7/1999 | |
| EP | 3395591 A1 * | | 10/2018 | B60G 7/001 |
| FR | 3018726 A1 | | 9/2015 | |
| GB | 2260961 A * | | 5/1993 | B29C 53/587 |
| IE | S 20040798 A2 | | 6/2005 | |
| IT | UD20110111 A1 | | 1/2013 | |
| JP | 60084419 A * | | 5/1985 | |
| JP | 03161322 A * | | 7/1991 | |

OTHER PUBLICATIONS

International Search Report and Written Opinion prepared by the European Patent Office, acting as the International Search Report, for international application PCT/US2020/038945 dated Oct. 14, 2020.

Formlabs; "Guide to Compression Molding From Prototyping to Mass Production", see https://formlabs.com/blog/compression-molding/, accessed Jul. 26, 2022, 16 pages.

* cited by examiner

ROD END MADE OF THERMOPLASTIC FIBER-REINFORCED PLASTIC

CROSS-REFERENCE TO RELATED APPLICATION

This application claims the benefit of priority under 35 USC § 119 of German Application No. 10-2019 004341.3, filed Jun. 23, 2019. The foregoing application is incorporated herein by reference in its entirety.

FIELD OF THE INVENTION

The present invention relates generally to a rod end made of thermoplastic fiber-reinforced plastic that extends, at least partially, around a bearing.

BACKGROUND

Fiber-reinforced plastics are fiber-reinforced materials in which fibrous substances are incorporated into a plastic. They are distinguished by properties including, e.g., high stiffness and strength with comparatively low weight.

In aerospace technology, as in almost no other field of engineering, lightweight design is of preeminent importance. Consequently, innovative lightweight design concepts are especially critical for the competitiveness of many aerospace components.

Rod ends, for example in passenger and cargo aircraft, are made predominantly of metallic materials such as steel, aluminum, and titanium. The use of fiber-reinforced plastics, in particular glass fiber and carbon fiber reinforced plastics, makes it possible to achieve significant weight and/or cost savings due to the great number of such rod ends in an airplane.

Rod ends made of plastic are already known from the prior art.

DE 1,995,788 U discloses a rod end with a plain bushing and threaded stem, wherein the plain bushing and the upper end of the threaded stem are surrounded by a plastic body produced as a single piece in an injection molding process.

A spherical plain bearing is known from DE 196 15 872 A1, of which the bearing socket and bearing body are both made of plastic, and which has, in one of its embodiments, a molded-on threaded stem.

The known rod ends made of plastic offer a significant weight saving as compared with metallic rod ends. A disadvantage in these designs is the relatively low strength of plastics and short fiber reinforced plastics, for which reason only relatively small loads can be transmitted with rod ends made of plastic.

SUMMARY OF THE INVENTION

The invention is based on the problem of developing a rod end that has a lower weight as compared with metallic solutions and at the same time can transmit high mechanical loads and can also be manufactured economically.

The present invention concerns a rod end with a bearing and where that bearing is at least partially enclosed by a component comprising a fiber-reinforced plastic that extends, at least partially, in the form of a loop around the bearing.

In certain embodiments, the fiber-reinforced plastic is a continuous-fiber reinforced thermoplastic.

In other embodiments, the bearing and/or the component is at least partially enclosed by a plastic. In further embodiments, the plastic is a thermoplastic that is short-fiber reinforced, long-fiber reinforced, or unreinforced thermoplastic.

In certain embodiments, the fiber-reinforced plastic forming a loop around the bearing extends at least partially into a threaded stem.

In some embodiments, the component comprises unidirectional continuous-fiber reinforced thermoplastic.

In other embodiments, the component comprises multiple layers of continuous-fiber reinforced thermoplastic. In certain embodiments, the bearing is fully enclosed one time or multiple times by continuous-fiber reinforced thermoplastic.

In other embodiments, the component extends in a threaded stem and conforms to a thread profile of the threaded stem.

In yet other embodiments, the component is connected to the enclosing short-fiber reinforced, long-fiber reinforced, or unreinforced thermoplastic. In some embodiments, the bearing is radially and axially surrounded by short-fiber reinforced, long-fiber reinforced, or unreinforced thermoplastic.

In certain other embodiments, the bearing comprises a metallic material, a plastic material, a fiber material, or combination thereof.

In certain embodiments, the component comprises one or more fibers selected from carbon fibers, basalt fibers, aramid fibers, plastic fibers, cotton fibers, metal fibers, glass fibers, and combinations thereof. In further embodiments, the plastic fibers are selected from polyamide fibers, polyester fibers, polyethylene fibers, and combinations thereof. In yet other embodiments, the component fibers are impregnated in thermoplastic material with a fiber volume fraction of at least 30%.

In certain embodiments, the rod end is an attachment element on a connecting rod with internal thread. In further embodiments, the rod end comprises a threaded stem, and the rod end is secured to the connecting rod by a lock washer and a lock nut.

In other embodiments, the rod end is in the form of a clevis. In yet other embodiments, the rod end is in the form of a swivel head.

In some embodiments, the loop fully surrounds the bearing multiple times and a thermoplastic further secures the bearing axially on a lateral surface of the bearing. In certain embodiments, the thermoplastic is a short-fiber reinforced thermoplastic, long-fiber reinforced thermoplastic, or unreinforced thermoplastic.

In certain embodiments, the plastic of the fiber-reinforced plastic is selected from polypropylene (PP), polyamide (PA), acrylonitrile butadiene styrene (ABS), polyethylene imine (PEI), polyphthalamide (PPA), polyphenylene sulfide (PPS), polyaryletherketone (PAEK), polyetherketoneketone (PEKK), polyetheretherketone (PEEK), and combinations thereof.

In other embodiments, the plastic of the short-fiber reinforced, long-fiber reinforced, or unreinforced thermoplastic is selected from polypropylene (PP), polyamide (PA), acrylonitrile butadiene styrene (ABS), polyethylene imine (PEI), polyphthalamide (PPA), polyphenylene sulfide (PPS), polyaryletherketone (PAEK), polyetherketoneketone (PEKK), polyetheretherketone (PEEK), and combinations thereof.

In certain embodiments, the fibers of the short-fiber reinforced thermoplastic and/or long-fiber reinforced thermoplastic are selected from carbon fibers, basalt fibers, aramid fibers, plastic fibers, cotton fibers, metal fibers, glass fibers, and combinations thereof. In further embodiments, the plastic fibers are selected from polyamide fibers, polyester fibers, polyethylene fibers, and combinations thereof.

DETAILED DESCRIPTION

The terms "comprising" and "comprises" in this disclosure can mean "including" and "includes" or can have the meaning commonly given to the term "comprising" or "comprises" in U.S. Patent Law. Terms "consisting essentially of" or "consists essentially of" if used in the claims have the meaning ascribed to them in U.S. Patent Law. Other aspects of the invention are described in or are obvious from (and within the ambit of the invention) the following disclosure.

The present invention solves the problems of the prior art by providing a rod end that has a low weight as compared with metallic rod ends while also being able to transmit high mechanical loads, unlike prior plastic rod ends, and can also be manufactured economically.

In certain embodiments, a rod end according to the present invention may be an attachment element for introducing tensile and compressive forces into various connecting rods, for example, for applications in the aviation field.

The rod end according to the present invention is also suitable for many other applications, in particular for the transmission of tensile and compressive forces, for guidance and mechanical mounting, and for supporting various connections or braces.

Conventional rod ends can be made from metal or plastic, but these have disadvantages such as high weight or inability to transmit high mechanical loads, respectively. In one aspect, the instant invention provides a rod end with a low weight in comparison to metallic rod ends and an ability to transmit high mechanical loads unlike conventional plastic rod ends, for example, as used in the aerospace and aviation fields.

In certain embodiments, the present invention achieves a high mechanical load capacity of a rod end by means of a loop that passes around a spherical plain bearing or a bushing and that is made of fiber-reinforced plastic. In certain embodiments, the fiber-reinforced plastic is a continuous-fiber reinforced composite material with thermoplastic matrix, such as a unidirectional continuous-fiber reinforced composite material with thermoplastic matrix. A fiber-reinforced plastic in which a fiber content of over 80% extends in the longitudinal direction of a fiber-reinforced plastic component of a rod end of the invention is referred to herein as a unidirectional fiber-reinforced plastic. A continuous fiber may be a single fiber or a bundle of fibers that originate in, e.g., a threaded stem of a rod end of the instant invention, wrap around a bearing or bushing in the rod end, and then terminate in the stem of the rod end. A continuous fiber is in contrast to a discontinuous fiber, such as a chopped fiber or broken stretched carbon fiber.

The present invention further concerns components comprising a fiber-reinforced plastic, such as a continuous-fiber reinforced composite material with a thermoplastic matrix. In certain embodiments, one or more fibers in the fiber-reinforced plastic are carbon fibers, basalt fibers, aramid fibers, plastic fibers, cotton fibers, metal fibers, glass fibers, and/or a combination thereof impregnated in plastic, such as a thermoplastic, material. In some embodiments, the fiber-reinforced plastic is made of fibers impregnated in plastic, such as a thermoplastic, material with a fiber volume fraction of at least 30%, at least 35%, at least 40%, at least 45%, at least 50%, at least 55%, at least 60%, at least 65%, at least 70%, at least 75%, at least 80%, at least 85%, or at least 90%.

In certain embodiments, a component comprising fiber-reinforced plastic, such as a continuous-fiber reinforced composite material with thermoplastic matrix, extends into a threaded stem of a rod end of the invention. The threaded stem can be implemented with an external or an internal thread. All known types of internal and external thread can be used, including special thread forms that may be used as well. By way of example, round thread, trapezoidal thread, buttress thread, and triangular thread are known thread types that may be used. An external thread is one that is present on the exterior, e.g., the exterior of a stem of a rod end. Conversely, an internal thread is one that is present on the interior, e.g., the interior of a stem of a rod end.

In certain further embodiments, a short-fiber reinforced, long-fiber reinforced, or unreinforced plastic, such as thermoplastic, fully or partially surrounds the loop of fiber-reinforced plastic into the threaded stem, and fully or partially defines the outer contour of the rod end.

In some embodiments, the loop of fiber-reinforced plastic has a thermoplastic matrix, by which means the fiber reinforced plastic can form an integral connection with the short-fiber reinforced, long-fiber reinforced, or unreinforced thermoplastic.

Any suitable method for making a bearing, a fiber-reinforced plastic, and/or a short-fiber reinforced plastic, long-fiber reinforced plastic, or unreinforced plastic for use in a rod end of the invention may be employed.

Likewise, any suitable method may be used for creating an integral connection between one or more of a bearing, fiber-reinforced plastic, or short-fiber reinforced, long-fiber reinforced, or unreinforced plastic in a rod end of the invention. In certain embodiments, by way of non-limiting example, a method for making an integral connection that positions a fiber-reinforced plastic component and a bearing in a rod end of the invention may be through injection molding, such that the fiber-reinforced plastic and bearing are precisely positioned with respect to one another. In other embodiments, use of injection molding may similarly be used to create an integral connection between a fiber-reinforced plastic component and a short-fiber reinforced, long-fiber reinforced, or unreinforced thermoplastic in a rod end of the invention, such that the fiber-reinforced plastic component and surrounding thermoplastic are precisely positioned with respect to one another.

Examples of plastics that may be used for the fiber-reinforced plastic component include polypropylene (PP), polyamide (PA), acrylonitrile butadiene styrene (ABS), polyethylene imine (PEI), polyphthalamide (PPA), polyphenylene sulfide (PPS), polyaryletherketone (PAEK), polyetherketoneketone (PEKK), plyetheretherketone (PEEK), and combinations thereof.

Examples of fibers that may be used in the fiber-reinforced plastic component include carbon fibers, basalt fibers, aramid fibers, plastic fibers (including polyamide fibers, polyester fibers, polyethylene fibers and others), cotton fibers, metal fibers, glass fibers, and combinations thereof.

Examples of plastics that may be used for the short-fiber reinforced, long-fiber reinforced, and/or unreinforced plastic include: polypropylene (PP), polyamide (PA), acrylonitrile butadiene styrene (ABS), polyethylene imine (PEI), polyphthalamide (PPA), polyphenylene sulfide (PPS), polyaryletherketone (PAEK), polyetherketoneketone (PEKK), polyetheretherketone (PEEK), and combinations thereof.

Examples of fibers that may be used in the short-fiber reinforced or long-fiber reinforced plastic include carbon fibers, basalt fibers, aramid fibers, plastic fibers (including polyamide fibers, polyester fibers, polyethylene fibers and others), cotton fibers, metal fibers, glass fibers, and combinations thereof. Short fibers for use in the short-fiber reinforced plastic according to the invention typically range from 0.1 mm to 1 mm in length. Long fibers for use in the long-fiber reinforced plastic according to the invention typically range from 1 mm to 50 mm in length.

The fibers in the short- or long-fiber reinforced plastic may be oriented in any suitable direction, including unidirectional and/or random directions.

To increase the content of the fiber-reinforced plastic, such as continuous-fiber reinforced composite material with thermoplastic matrix, in a rod end of the invention, the fiber-reinforced plastic may be implemented in the rod end as multiple layers. The multiple layers may all be the same, differing, or have a varying combination of the same and differing fiber-reinforced material. In one exemplary embodiment, one layer may be a multi-directional continuous-fiber reinforced thermoplastic while two additional layers are unidirectional continuous-fiber reinforced thermoplastic.

In some embodiments, to better accommodate tensile and compressive forces, a fiber-reinforced plastic, such as a unidirectional fiber-reinforced plastic, can, in addition, fully surround a spherical plain bearing or a bushing one time or multiple times in accordance with the invention.

In certain embodiments, the instant invention includes one or more holes for accommodating a pin. Additionally, a spherical plain bearing; a bushing; and the outer ring of an articulated element, bushing, or spherical plain bearing, are also referred to herein as bearings. Generally, a bearing may support one or more components that move against each other.

In certain embodiments, the bearing comprises a metallic material, a plastic material, a fiber composite material, or a combination thereof.

In some embodiments, the present invention achieves a high mechanical load capacity of a rod end by means of a fiber-reinforced plastic, such as a continuous-fiber reinforced composite material with thermoplastic matrix, that extends in the form of a loop, at least partially, around a bearing, and where the fiber-reinforced plastic also extends into the threaded stem.

"In the form of a loop" means surrounding or encircling of a bearing by fiber-reinforced plastic, such as a continuous-fiber reinforced composite material with thermoplastic matrix, with a wrap angle of more than 160°. In certain embodiments, the wrap angle is more than 180°.

Figure 6:
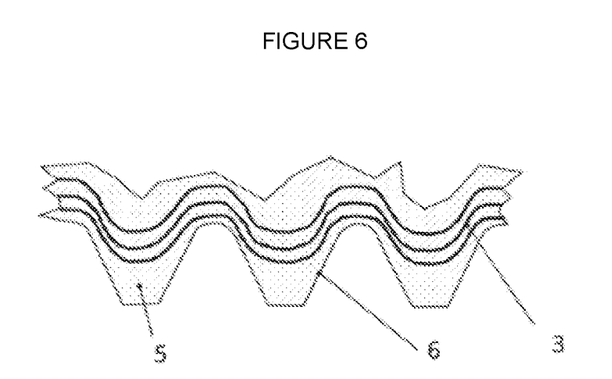
FIG. 6 illustrates a cross-sectional view of a thread profile (6) according to the invention made of short-fiber reinforced, long-fiber reinforced, or unreinforced thermoplastic (5) and a continuous-fiber reinforced composite material with thermoplastic matrix (3), wherein the continuous-fiber reinforced composite material with thermoplastic matrix (3) extends along the thread flanks.

In certain embodiments, the fiber-reinforced plastic in the threaded stem strengthens the rod end against a breaking away of the threaded stem. In addition, in further embodiments, a course of fibers, such as continuous fibers, conforms to a thread profile near the surface of the threaded stem in a shape projected by the fibers into the thread ridges, e.g., as in FIG. 6, and strengthens the threaded stem against shearing off of the thread ridges. For example, in certain embodiments, the fibers are continuous fibers that conform to a thread profile near the surface of a threaded stem. FIG. 6 shows where continuous fibers have conformed to the thread ridges of the threaded stem shape. By having the continuous fibers conform to the profile near the surface of the threaded stem, the threaded stem is strengthened against shearing off of the thread ridges.

To accommodate forces that act axially, a bearing, such as a spherical plain bearing or bushing, can also be partially or fully secured in a positive-locking manner by short-fiber reinforced, long-fiber reinforced, or unreinforced thermoplastic over one or more lateral surfaces or contours introduced into the bearing, e.g., the spherical plain bearing or bushing.

Generally, rod ends are used in an extremely wide variety of sizes and in high quantities. In certain embodiments of the invention, the inventive rod ends are in the form of clevises or swivel heads.

Figure 1:
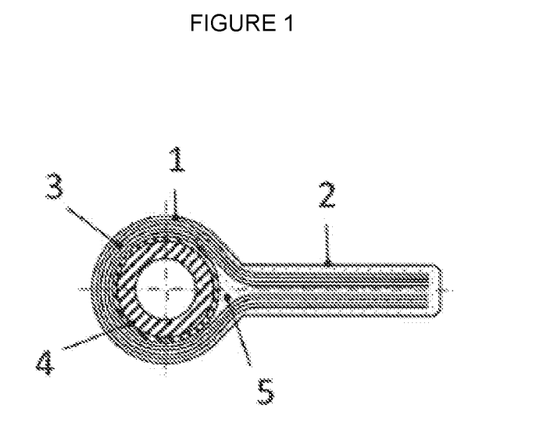
FIG. 1 illustrates a side cross-sectional view of a rod end (1) according to the invention with a threaded stem (2) and comprising a continuous-fiber reinforced composite material with thermoplastic matrix (3) in the form of a loop that partially surrounds a bearing (4), and a short-fiber reinforced, long-fiber reinforced, or unreinforced thermoplastic (5). The thermoplastic (5) fully surrounds the loop of fiber-reinforced thermoplastic (3) into the threaded stem (2). The short-fiber reinforced, long-fiber reinforced, or unreinforced thermoplastic (5) defines the outer contour of the rod end (1). The continuous-fiber reinforced composite material with thermoplastic matrix (3) is implemented in four layers in this representation.

FIG. 1 illustrates a side cross-sectional view of a rod end (1) according to the invention. FIG. 1 depicts a threaded stem (2) with a bearing (4). The threaded stem (2) is adjacent to the bearing (4). The central axis of the stem (2) intersects the center of the bearing (4). A continuous-fiber reinforced material with thermoplastic matrix (3) extends into the stem (2). FIG. 1 also illustrates a continuous-fiber reinforced composite material with thermoplastic matrix (3) in the form of a loop. The continuous-fiber reinforced composite material with thermoplastic matrix (3) is a loop that partially surrounds the bearing (4). The bearing (4), however, is not exposed because the remaining "free space" is filled by a short-fiber reinforced, long-fiber reinforced, or unreinforced thermoplastic (5). The thermoplastic (5) also surrounds the fiber-reinforced thermoplastic (3) into the stem (2) and forms the outer contour of the rod end (1). The continuous-fiber reinforced composite material with thermoplastic matrix (3) is implemented in four layers in this representation.

Figure 2:
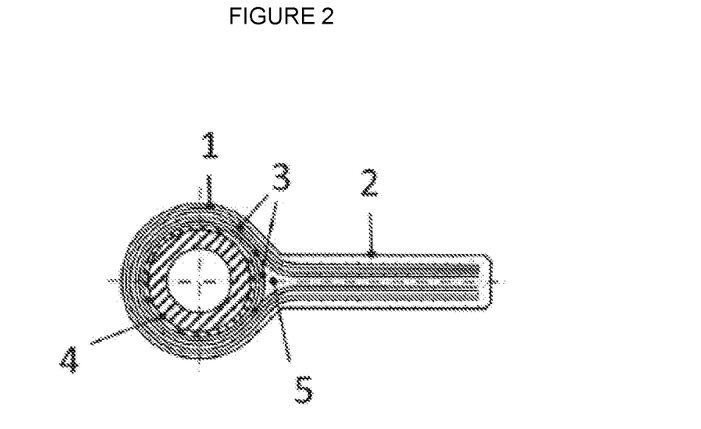
FIG. 2 illustrates a side cross-sectional view of a rod end (1) according to the invention with a threaded stem (2) and comprising a continuous-fiber reinforced composite material with thermoplastic matrix (3) in the form of a loop, which fully surrounds a bearing (4) multiple times, and a short-fiber reinforced, long-fiber reinforced, or unreinforced thermoplastic (5). The thermoplastic (5) fully surrounds the loop of fiber-reinforced thermoplastic (3) into the threaded stem (2). The short-fiber reinforced, long-fiber reinforced, or unreinforced thermoplastic (5) defines the outer contour of the rod end (1).

FIG. 2 illustrates a side cross-sectional sectional view of a rod end (1) according to the invention with a threaded stem (2) and comprising a continuous-fiber reinforced composite material with thermoplastic matrix (3) in the form of a loop. Here, the loop fully surrounds a bearing (4) multiple times. There is a short-fiber reinforced, long-fiber reinforced, or unreinforced thermoplastic (5) that surrounds the fiber-reinforced thermoplastic matrix (3) into the stem (2) and forms the outer contour of the rod end (1). The bearing (4) is fully surrounded by the continuous-fiber reinforced composite material with thermoplastic matrix (3).

Figure 3:
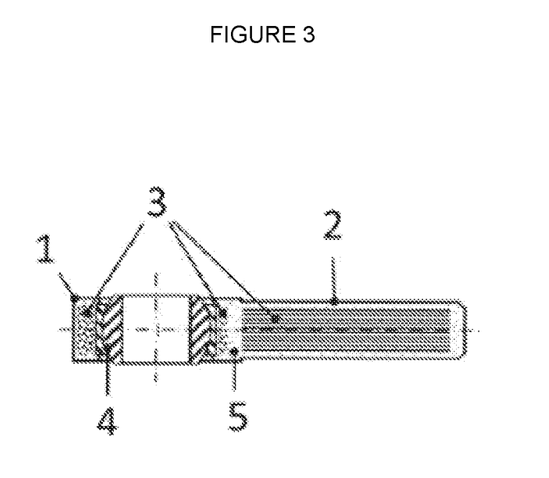
FIG. 3 illustrates a side cross-sectional view of a rod end (1) according to the invention with a threaded stem (2) and comprising a continuous-fiber reinforced composite material with thermoplastic matrix (3) in the form of a loop, which fully surrounds a bearing (4) multiple times, and a short-fiber reinforced, long-fiber reinforced, or unreinforced thermoplastic (5), which also secures the bearing (4) axially on its lateral surfaces. The thermoplastic (5) fully surrounds the loop of fiber-reinforced thermoplastic (3) into the threaded stem (2). The short-fiber reinforced, long-fiber reinforced, or unreinforced thermoplastic (5) defines the outer contour of the rod end (1).

FIG. 3 illustrates a cross-sectional view of a rod end (1) according to the invention with a threaded stem (2) and comprising a continuous-fiber reinforced composite material with thermoplastic matrix (3) in the form of a loop. The continuous-fiber reinforced thermoplastic (3) fully surrounds a bearing (4) multiple times. FIG. 3 further illustrates a short-fiber reinforced, long-fiber reinforced, or unreinforced thermoplastic (5), which also secures the bearing (4) axially on the bearing's (4) lateral surfaces.

Figure 4:
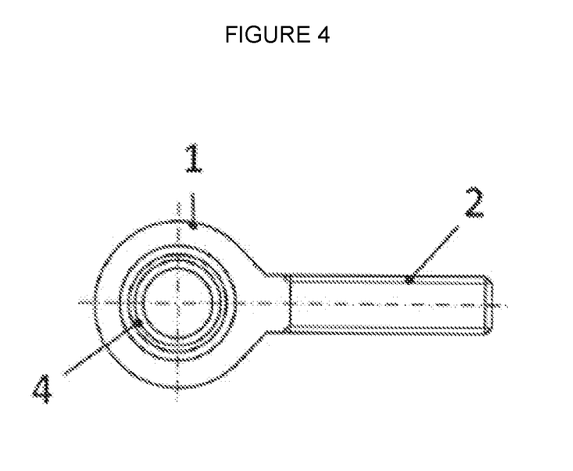
FIG. 4 illustrates a side view of a rod end (1) according to the invention with threaded stem (2) and a bearing (4).

FIG. 4 illustrates a side view of the outside of a rod end (1) according to the invention with a bearing (4) and threaded stem (2). The material on the surface of the rod end (1) is made of short-fiber reinforced, long-fiber reinforced, or unreinforced thermoplastic (5). FIG. 4 further illustrates a thread of the threaded stem (2) as depicted for a technical drawing as would be appreciated by a person of ordinary skill in the art.

Figure 5:
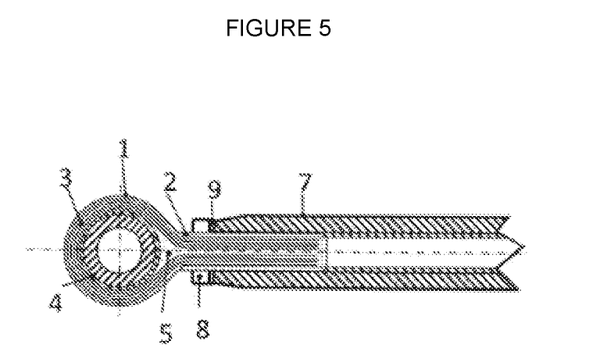
FIG. 5 illustrates a side cross-sectional view of a rod end (1) according to the invention with a threaded stem (2) and comprising a continuous-fiber reinforced composite material with thermoplastic matrix (3) in the form of a loop that surrounds a bearing (4), and a short-fiber reinforced, long-fiber reinforced, or unreinforced thermoplastic (5), built into a connecting rod with an internal thread (7) and secured by a lock washer (9) and a lock nut (8). The thermoplastic (5) fully surrounds the loop of fiber-reinforced thermoplastic (3) into the threaded stem (2). The short-fiber reinforced, long-fiber reinforced, or unreinforced thermoplastic (5) defines the outer contour of the rod end (1).

FIG. 5 illustrates a side cross-sectional view of a rod end (1) according to the invention with a threaded stem (2) and comprising a continuous-fiber reinforced composite material with thermoplastic matrix (3) in the form of a loop and a short-fiber reinforced, long-fiber reinforced, or unreinforced thermoplastic (5), built into a connecting rod with an internal thread (7) and secured by a lock washer (9) and a lock nut (8).

FIG. 6 illustrates a cross-sectional view of a thread profile (6) according to the invention made of short-fiber reinforced, long-fiber reinforced, or unreinforced thermoplastic (5) and a continuous-fiber reinforced composite material with thermoplastic matrix (3). FIG. 6 shows where the continuous-fiber reinforced composite material with thermoplastic matrix (3) extends along the thread flanks.

Figure 7:
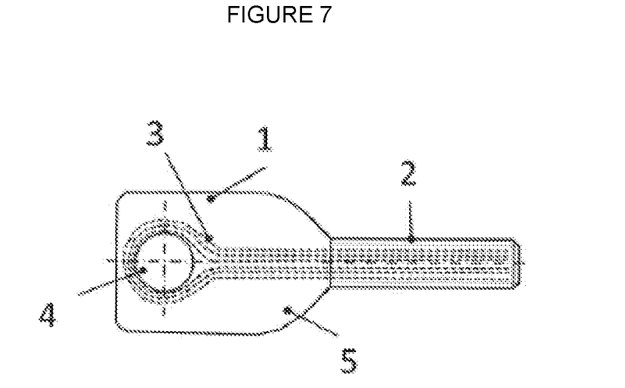
FIG. 7 illustrates a side cross-sectional view of a rod end (1) according to the invention in the form of a clevis, comprising a bearing (4), and threaded stem (2) with, shown in dashed lines, an internal, continuous-fiber reinforced composite material with thermoplastic matrix (3) in the form of a loop, and a short-fiber reinforced, long-fiber reinforced, or unreinforced thermoplastic (5). The thermoplastic (5) fully surrounds the loop of fiber-reinforced thermoplastic (3) into the threaded stem (2). The short-fiber reinforced, long-fiber reinforced, or unreinforced thermoplastic (5) defines the outer contour of the rod end (1). The continuous-fiber reinforced composite material with thermoplastic matrix (3) is implemented in three layers in this representation.

FIG. 7 illustrates a side cross-sectional view of a rod end (1) according to the invention in the form of a clevis, and comprising a bearing (4), and threaded stem (2). Shown in dashed lines is an internal continuous-fiber reinforced composite material with thermoplastic matrix (3) in the form of a loop, and a short-fiber reinforced, long-fiber reinforced, or unreinforced thermoplastic (5). The continuous-fiber reinforced composite material with thermoplastic matrix (3) is implemented in three layers in this illustration.

Figure 8:
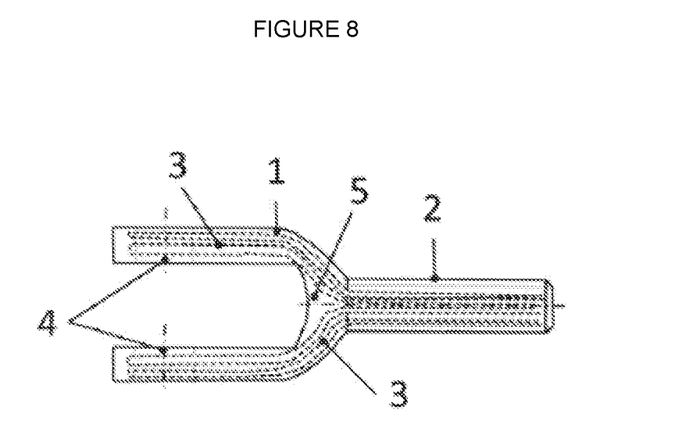
FIG. 8 illustrates a cross-sectional view of the rod end (1) of FIG. 7, rotated by 90°.

FIG. 8 illustrates a cross-sectional view of the rod end of FIG. 7, rotated by 90°.

Modifications to the above would be obvious to those of ordinary skill in the art, but would not bring the invention so modified beyond the scope of the present invention. The claims to follow should be construed to cover such situations.

The invention claimed is:

1. A rod end comprising a bearing, wherein the bearing is at least partially enclosed by a component comprising a first plastic, wherein the first plastic is a fiber-reinforced first plastic that extends, at least partially, in the form of a loop around the bearing, wherein the fiber-reinforced first plastic forming the loop around the bearing extends at least partially into a threaded stem and wherein fibers in the fiber-reinforced first plastic conform to a thread profile adjacent to a surface of the threaded stem.

2. The rod end according to claim 1, wherein the fiber-reinforced first plastic is a continuous-fiber reinforced thermoplastic.

3. The rod end according to claim 1, wherein the bearing and/or the component is at least partially enclosed by a second plastic.

4. The rod end according to claim 3, wherein the bearing is radially and axially surrounded by the second plastic, wherein the second plastic comprises short-fiber reinforced, long-fiber reinforced, or unreinforced thermoplastic.

5. The rod end according to claim 3, wherein the loop fully surrounds the bearing multiple times and the second plastic is a thermoplastic that further secures the bearing axially on a lateral surface of the bearing.

6. The rod end according to claim 5, wherein the thermoplastic is selected from the group consisting of: short-fiber reinforced thermoplastic, long-fiber reinforced thermoplastic, and unreinforced thermoplastic.

7. The rod end according to claim 3, wherein the second plastic is short-fiber reinforced thermoplastic, long-fiber reinforced thermoplastic, or unreinforced thermoplastic.

8. The rod end according to claim 7, wherein the component is connected to the enclosing second plastic that is short-fiber reinforced, long-fiber reinforced, or unreinforced thermoplastic.

9. The rod end according to claim 7, wherein the second plastic is selected from the group consisting of: polypropylene (PP), polyamide (PA), acrylonitrile butadiene styrene (ABS), polyethylene imine (PEI), polyphthalamide (PPA), polyphenylene sulfide (PPS), polyaryletherketone (PAEK), polyetherketoneketone (PEKK), polyetheretherketone (PEEK), and combinations thereof.

10. The rod end of claim 7, wherein the second plastic is a short-fiber reinforced thermoplastic or long-fiber reinforced thermoplastic, wherein one or more fibers in the short-fiber reinforced thermoplastic or long-fiber reinforced thermoplastic is selected from the group consisting of: carbon fibers, basalt fibers, aramid fibers, plastic fibers, cotton fibers, metal fibers, glass fibers, and combinations thereof.

11. The rod end of claim 10, wherein the plastic fibers are selected from the group consisting of: polyamide fibers, polyester fibers, polyethylene fibers, and combinations thereof.

12. The rod end according to claim 1, wherein the component comprises unidirectional continuous-fiber reinforced thermoplastic.

13. The rod end according to claim 1, wherein the component comprises multiple layers of continuous-fiber reinforced thermoplastic.

14. The rod end according to claim 1, wherein the bearing is fully enclosed one time or multiple times by the component, wherein the component comprises continuous-fiber reinforced thermoplastic.

15. The rod end according to claim 1, wherein the bearing comprises a metallic material, a plastic material, a fiber material, or a combination thereof.

16. The rod end according to claim 1, wherein the component comprises one or more fibers selected from the group consisting of: carbon fibers, basalt fibers, aramid fibers, plastic fibers, cotton fibers, metal fibers, glass fibers, and combinations thereof.

17. The rod end of claim 16, wherein the plastic fibers are selected from the group consisting of: polyamide fibers, polyester fibers, polyethylene fibers, and combinations thereof.

18. The rod end according to claim 1, wherein the component comprises one or more fibers impregnated in thermoplastic material with a fiber volume fraction of at least 30%.

19. The rod end according to claim 1, wherein the rod end is an attachment element on a connecting rod with internal thread.

20. The rod end according to claim 19, wherein the rod end is secured to the connecting rod by a lock washer and a lock nut.

21. The rod end according to claim 1, wherein the rod end is in the form of a clevis.

22. The rod end according to claim 1, wherein the rod end is in the form of a rotatable head.

23. The rod end according to claim 1, wherein the plastic of the fiber-reinforced first plastic is selected from the group consisting of: polypropylene (PP), polyamide (PA), acrylonitrile butadiene styrene (ABS), polyethylene imine (PEI), polyphthalamide (PPA), polyphenylene sulfide (PPS), polyaryletherketone (PAEK), polyetherketoneketone (PEKK), polyetheretherketone (PEEK), and combinations thereof.

* * * * *